(12) United States Patent
Iguchi et al.

(10) Patent No.: US 11,710,599 B2
(45) Date of Patent: Jul. 25, 2023

(54) CERAMIC ELECTRONIC DEVICE

(71) Applicant: TDK CORPORATION, Tokyo (JP)

(72) Inventors: Toshihiro Iguchi, Tokyo (JP); Yuichiro Sueda, Tokyo (JP); Ryota Namiki, Tokyo (JP); Yasuhiro Okui, Tokyo (JP); Atsushi Watanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/684,944

(22) Filed: Mar. 2, 2022

(65) Prior Publication Data

US 2022/0285095 A1 Sep. 8, 2022

(30) Foreign Application Priority Data

Mar. 8, 2021 (JP) .................................. 2021-036548

(51) Int. Cl.
*H01G 4/12* (2006.01)
*H01G 4/232* (2006.01)
*H01G 4/30* (2006.01)

(52) U.S. Cl.
CPC ......... *H01G 4/1209* (2013.01); *H01G 4/2325* (2013.01); *H01G 4/30* (2013.01)

(58) Field of Classification Search
CPC ............................. H01G 4/232; H01G 4/2325
See application file for complete search history.

(56) References Cited

U.S. PATENT DOCUMENTS

| 5,198,154 A * | 3/1993 | Yokoyama | ........... H01G 4/0085 252/514 |
| 5,707,555 A * | 1/1998 | Ohtani | ................. H01G 4/2325 252/514 |
| 2005/0184278 A1* | 8/2005 | Miki | ........................ H01B 1/16 252/500 |

FOREIGN PATENT DOCUMENTS

JP          H04-171912 A          6/1992

* cited by examiner

*Primary Examiner* — Eric W Thomas
(74) *Attorney, Agent, or Firm* — Oliff PLC

(57) ABSTRACT

A ceramic electronic device includes an element body and an external electrode. The element body is formed by laminating a ceramic layer and an internal electrode layer. The external electrode is electrically connected to at least one end of the internal electrode layer. The external electrode includes a baked electrode layer. The baked electrode layer includes a first region and a second region. The first region is contacted with an end surface of the element body and located near a joint boundary with the element body. The second region is located outside the first region and constituting an outer surface of the baked electrode layer. The first region includes a first glass having a predetermined composition. The second region includes a second glass having a predetermined composition.

8 Claims, 4 Drawing Sheets

CERAMIC ELECTRONIC DEVICE

BACKGROUND OF THE INVENTION

The present invention relates to a ceramic electronic device including an external electrode.

As shown in Patent Document 1, a ceramic electronic device including an element body containing a ceramic component and external electrodes formed on an outer surface of the element body is known. Baked electrodes are widely used as external electrodes for ceramic electronic devices, and the baked electrodes can be formed by applying a conductive paste containing conductor powder and glass frit to the surface of the element body and baking it. In Patent Document 1, the solder wettability of the external electrodes is improved by forming a plating electrode on the baked electrode as mentioned above.

However, the external electrodes disclosed in Patent Document 1 have a problem that glass frit is deposited on the surfaces of the electrodes if baked at a high temperature, which makes it difficult for plating to adhere, and that many voids are generated in the electrodes if baked at a low temperature, which causes plating to intrude the inside of the external electrodes during plating and reach the element body to cause troubles.

Accordingly, it is difficult for the conventional technique as shown in Patent Document 1 to achieve both the plating property of the baked electrode (easiness of forming the plated electrode) and the prevention on the intrusion of plating into the element body.

Patent Document 1: JPH04171912 (A)

BRIEF SUMMARY OF THE INVENTION

The present invention has been achieved under such circumstances. It is an object of the present invention to provide a ceramic electronic device including a baked electrode layer having a favorable plating property and being able to prevent an intrusion of plating into an element body.

To achieve the above object, a ceramic electronic device according to the present invention comprises:

an element body formed by laminating a ceramic layer and an internal electrode layer; and an external electrode electrically connected to at least one end of the internal electrode layer, wherein the external electrode includes a baked electrode layer, the baked electrode layer includes:

a first region contacted with an end surface of the element body and located near a joint boundary with the element body; and a second region located outside the first region and constituting an outer surface of the baked electrode layer, the first region includes a first glass, the second region includes a second glass, a molar content rate of B in terms of oxide to a total molar content of B, Si, and Zn in terms of oxide in the first glass is higher than a molar content rate of B in terms of oxide to a total molar content of B, Si, and Zn in terms of oxide in the second glass, a molar content rate of Si in terms of oxide to a total molar content of B, Si, and Zn in terms of oxide in the first glass is lower than a molar content rate of Si in terms of oxide to a total molar content of B, Si, and Zn in terms of oxide in the second glass, and an oxide of B is $B_2O_3$, an oxide of Si is $SiO_2$, and an oxide of Zn is ZnO, in terms of oxide.

The present inventors have found that the multilayer ceramic capacitor having the above-mentioned configurations improves the plating property of the baked electrode layer and can prevent the intrusion of plating into the element body. The reason why the above-mentioned effects are obtained is not necessarily clear, but the following reasons can be considered.

In the ceramic electronic device according to the present invention, as mentioned above, the second region including the second glass having a predetermined composition exists on the outer surface of the baked electrode layer to be in contact with the plating electrode. The second glass has a high softening point. It is thus considered that the deposition of the second glass on the outer surface of the baked electrode layer can be prevented. As a result, the generation of plating defects can be prevented in the formation of the plating electrode on the baked electrode layer.

In the ceramic electronic device according to the present invention, the first glass having a predetermined composition is contained in the first region to be bonded with the end surface of the element body. The first glass has a low softening point. Thus, the inclusion of the first glass improves the sinterability of the baked electrode layer. In addition, the first glass is spread wet and filled in the conductor and between the conductor and the end surface of the element body. As a result, the structure of the external electrode (baked electrode layer) in the vicinity of the element body becomes dense. Thus, the intrusion of plating into the element body can be prevented effectively.

The ceramic layer may include a perovskite compound represented by $ABO_3$ as a main component.

The perovskite compound represented by $ABO_3$ may be represented by $(Ba_{1-a-b}Sr_aCa_b)_m(Ti_{1-c-d}Zr_cHf_d)O_3$ and satisfy $0.94<m<1.1$, $0 \le a \le 1$, $0 \le b \le 1$, $0 \le c \le 1$, and $0 \le d \le 1$.

The plating solution is acidic. Thus, if the plating intrudes the internal electrode layer of the element body, the internal electrode layer containing Ni or the like (hereinafter, referred to as a Ni internal electrode layer) is easily corroded. In this case, the interface between the ceramic layer and the internal electrode layer is particularly easily corroded. When the main component of the ceramic layer is $(Ca, Sr)ZrO_3$ or $(Ca, Sr)(Ti, Zr)O_3$, the ceramic layer is harder than when the main component of the ceramic layer is $BaTiO_3$, and the difference in linear expansion coefficient between $(Ca,Sr)ZrO_3$ or $(Ca,Sr)(Ti,Zr)O_3$ and the Ni internal electrode layer is large. Thus, when the main component of the ceramic layers is $(Ca, Sr)ZrO_3$ or $(Ca, Sr)(Ti, Zr)O_3$, the intrusion of the plating solution into the element body is considered to particularly easily corrode the interface between the internal electrode layer and the ceramic layer due to stress being generated thereon and peel the interface between the internal electrode layer and the ceramic layer due to the corrosion, so that cracks are likely to occur.

On the other hand, according to the present invention, since the intrusion of plating into the element body can be prevented, the generation of cracks can be prevented even if the main component of the ceramic layer is $(Ca, Sr)ZrO_3$ or $(Ca, Sr)(Ti, Zr)O_3$.

In addition, the plating solution is acidic and thus contains hydrogen ions. The intrusion of hydrogen ions into the element body may decrease the electrical resistance of the capacitor. In particular, when the main component of the ceramic layer is $BaTiO_3$, hydrogen ions are more likely to permeate the element body than when the main component of the ceramic layer is $(Ca, Sr)ZrO_3$.

On the other hand, according to the present invention, since the intrusion of plating into the element body can be prevented, the decrease in the electric resistance of the capacitor can be prevented even if the main component of the ceramic layer is $BaTiO_3$.

As a result of the above, the ceramic electronic device of the present invention has a sufficient resistance and can reduce the number of cracks to a low level.

Preferably, the external electrode includes at least one of Cu and Cu alloys as a main component.

Preferably, a B content in terms of oxide in the second glass is 0.25-0.4 parts by mol, a Si content in terms of oxide in the second glass is 0.4-0.6 parts by mol, and a Zn content in terms of oxide in the second glass is 0.1-0.35 parts by mol, provided that a total content of B, Si, and Zn in terms of oxide in the second glass is 1 part by mol.

This further improves the plating property of the external electrode (baked electrode layer).

Preferably a B content in terms of oxide in the first glass is 0.4-0.6 parts by mol, a Si content in terms of oxide in the first glass is 0.15-0.35 parts by mol, and a Zn content in terms of oxide in the first glass is 0.1-0.35 parts by mol, provided that a total content of B, Si, and Zn in terms of oxide in the first glass is 1 part by mol.

This can further prevent the intrusion of plating into the element body.

The first glass and the second glass may contain B as $B_2O_3$, Si as $SiO_2$, and Zn as ZnO.

Preferably, a ratio (t2/Ts) of an average thickness (t2) of the second region to an average thickness (Ts) of the baked electrode layer is 0.22 to 0.78.

When (t2/Ts) is within the above-mentioned range, the prevention effect on the intrusion of plating into the element body can be enhanced compared to when (t2/Ts) is above the above-mentioned range. When (t2/Ts) is within the above-mentioned range, the plating property of the baked electrode layer is further improved compared to when (t2/Ts) is below the above-mentioned range.

Preferably, an average (N/M) of a ratio of a total area (N) of non-metal components and voids to a unit cross-sectional area (M) of the baked electrode layer is 0.10 to 0.45, and the non-metal components include the first glass and the second glass.

When (N/M) is within the above-mentioned range, the prevention effect on the intrusion of plating into the element body can be enhanced compared to when (N/M) is below the above-mentioned range. When (N/M) is within the above-mentioned range, the plating property of the baked electrode layer is further improved compared to when (N/M) is above the above-mentioned range.

Preferably, the element body includes a boundary layer at an end of the ceramic layer, the ceramic layer includes a perovskite compound represented by $ABO_3$ as a main component, the boundary layer includes an A-site element and a B-site element as a main component, and the boundary layer includes 0.27-0.40 parts by mol of the A-site element, provided that a total of the A-site element and the B-site element included in the boundary layer is 1 part by mol.

The perovskite compound may be represented by $(Ba_{1-a-b}Sr_aCa_b)_m(Ti_{1-c-d}Zr_cHf_d)O_3$ and satisfy $0.94<m<1.1$, $0 \le a \le 1$, $0 \le b \le 1$, $0 \le c \le 1$, and $0 \le d \le 1$.

Preferably, the perovskite compound represented by $(Ba_{1-a-b}Sr_aCa_b)_m(Ti_{1-c-d}Zr_cHf_d)O_3$ satisfies $0 \le a<1$, $0 \le b<1$, $0 \le c<1$, and $0 \le d<1$.

The external electrode may include an interface protrusion on at least a part of a surface of the boundary layer.

Preferably, the interface protrusion includes an A-site element, a B-site element, and Si as a main component, and the interface protrusion includes 0.35-0.45 parts by mol of the A-site element, 0.10-0.30 parts by mol of the B-site element, and 0.35-0.45 parts by mol of Si, provided that a total of the A-site element, the B-site element, and Si included in the interface protrusion is 1 part by mol.

Preferably, the boundary layer has an average thickness of 2-20 µm.

Preferably, the boundary layer is provided so as to contact with the internal electrode layer, and the internal electrode layer includes Ni or Ni alloy as a main component.

BRIEF DESCRIPTION OF THE DRAWING(S)

DETAILED DESCRIPTION OF THE INVENTION

First Embodiment

Hereinafter, the present invention is explained in detail based on embodiments shown in the figures.

Figure 1:
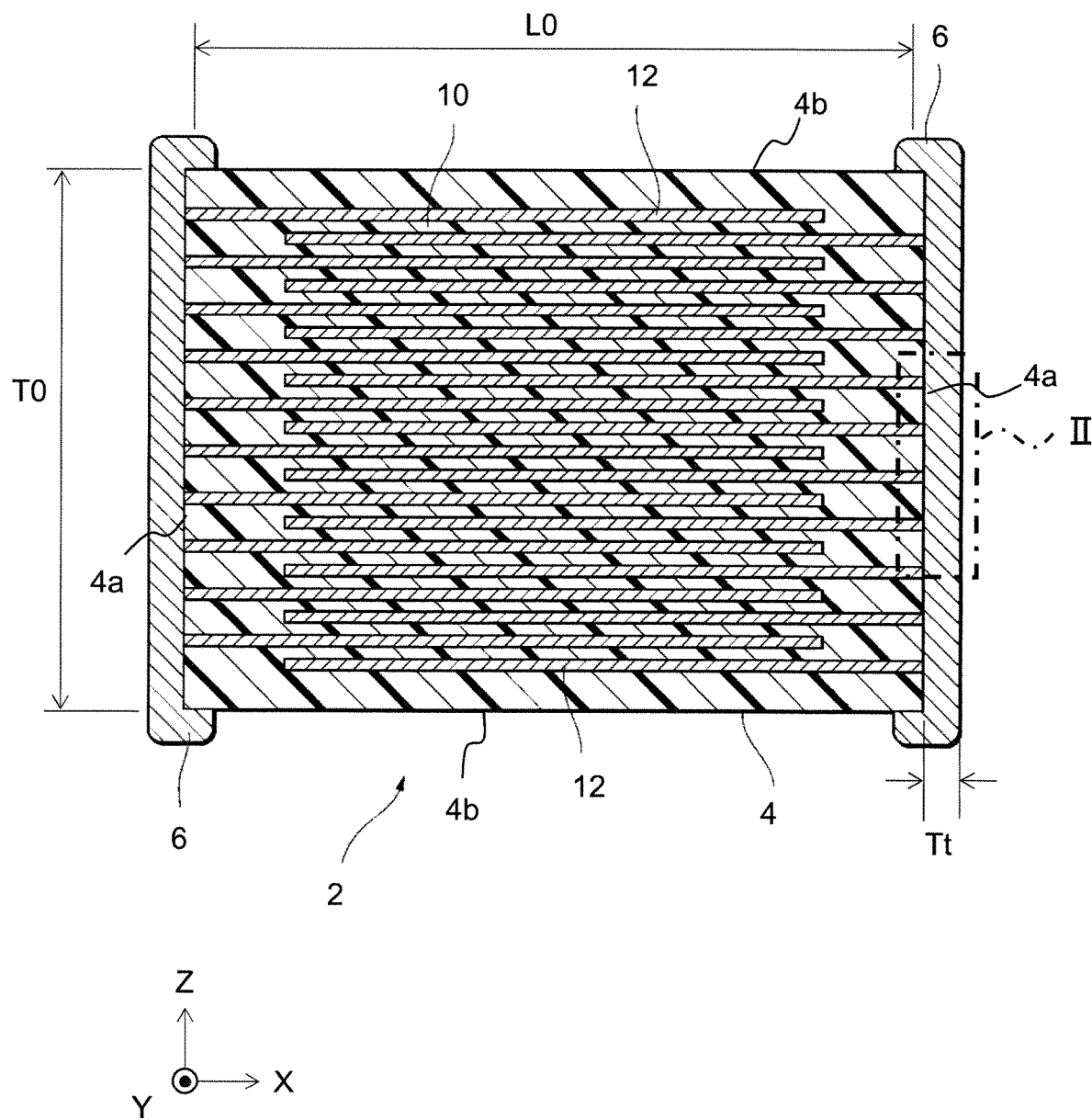
FIG. 1 is a schematic cross-sectional view of a multilayer ceramic capacitor according to an embodiment of the present invention.

In the present embodiment, a multilayer ceramic capacitor 2 shown in FIG. 1 is described as a ceramic electronic device according to the present invention. The multilayer ceramic capacitor 2 includes an element body 4 and a pair of external electrodes 6 formed on the external surface of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction, but the element body 4 may have any other shape, such as elliptical columnar shape, columnar shape, and prismatic shape. The element body 4 has any outer size and can have, for example, a length L0 of 0.4-5.7 mm in the X-axis direction, a width W0 of 0.2-5.0 mm in the Y-axis direction, and a height T0 of 0.2-3.0 mm in the Z-axis direction.

In the present embodiment, the X-axis, the Y-axis, and the Z-axis are perpendicular to each other. In the present embodiment, the "inside" means the side closer to the center of the multilayer ceramic capacitor 2, and the "outside" means the side farther from the center of the multilayer ceramic capacitor 2.

The element body 4 includes dielectric layers 10 (ceramic layers) and internal electrode layers 12 substantially parallel to the plane including the X-axis and the Y-axis. In the inside of the element body 4, the dielectric layers 10 and the internal electrode layers 12 are laminated alternately along the Z-axis direction (lamination direction). Here, "substantially parallel" means that most parts are parallel, but there may be a part that is not slightly parallel, and the dielectric layers 10 and the internal electrode layers 12 may slightly be uneven or inclined.

According to FIG. 1, the end surfaces of the element body 4 in the X-axis direction are flat surfaces. In other words, the dielectric layers 10 and the internal electrode layers 12 are laminated so as to be flush with each other. However, the end surfaces of the element body 4 in the X-axis direction may have a non-planar part. Moreover, the dielectric layers 10 and the internal electrode layers 12 may not be flush with each other and may be laminated, for example, in a state where the dielectric layers 10 are partly scraped off or the internal electrode layers 12 are partly protruding.

The dielectric layers 10 are made of any material and, for example, can include a perovskite compound represented by $ABO_3$, a tungsten bronze compound, or the like as a main component. Preferably, the dielectric layers 10 include a perovskite compound represented by $ABO_3$ as a main component.

The main component of the dielectric layers 10 is a component contained in the dielectric layers 10 by 80 mass % or more.

The perovskite compound represented by $ABO_3$ is represented by, for example, $(Ba_{1-a-b}Sr_aCa_b)_m(Ti_{1-c-d}Zr_cHf_d)O_3$ and may satisfy $0.94 < m < 1.1$, $0 \leq a \leq 1$, $0 \leq b \leq 1$, $0 \leq c \leq 1$, and $0 \leq d \leq 1$.

"m" indicates an elemental ratio of A-site and B-site. For example, $0.94 < m < 1.1$ is satisfied.

"a" indicates an elemental ratio of Sr. For example, $0 \leq a \leq 1$ is satisfied. Preferably, $0 \leq a < 1$ is satisfied.

"b" indicates an elemental ratio of Ca. $0 \leq b \leq 1$ is satisfied. Preferably, $0 \leq b < 1$ is satisfied.

"c" indicates an elemental ratio of Zr. $0 \leq c \leq 1$ is satisfied. Preferably, $0 \leq c < 1$ is satisfied.

"d" indicates an elemental ratio of Hf. $0 \leq d \leq 1$ is satisfied. Preferably, $0 \leq d < 1$ is satisfied.

The elemental ratio of oxygen (O) in the above-mentioned composition formula may slightly deviate from the stoichiometric composition.

In addition to the main component, the dielectric layers 10 according to the present embodiment may include sub-components, such as Mn compounds, Mg compounds, Cr compounds, Ni compounds, rare earth element compounds, Si compounds, Li compounds, B compounds, and V compounds. There is no limit to the type, combination, or addition amount of the sub-components.

The average thickness (Td) of the dielectric layers 10 sandwiched by the internal electrode layers 12 is not limited and is, for example, preferably 30 μm or less, more preferably 15 μm or less, and still more preferably 10 μm or less. The lamination number of dielectric layers 10 is determined based on desired characteristics and is not limited. For example the lamination number of dielectric layers 10 is preferably 20 or more and is more preferably 50 or more.

Meanwhile, the internal electrode layers 12 are laminated between the dielectric layers 10. The lamination number of internal electrode layers 12 is determined based on the lamination number of dielectric layers 10. The average thickness (Te) of the internal electrode layers 12 per layer is not limited and can be, for example, 3.0 μm or less.

The internal electrode layers 12 are laminated so that their ends on one side are alternately exposed to the two end surfaces 4a of the element body 4 facing each other in the X-axis direction. Then, each of the pair of external electrodes 6 is formed on one end surface 4a of the element body 4 and is electrically connected to the exposed ends of the internal electrode layers 12 alternately arranged. Since the internal electrode layers 12 and the external electrodes 6 are formed in such a manner, a capacitor circuit with the external electrodes 6 and the internal electrode layers 12 is formed.

That is, the internal electrode layers 12 function as a part of the capacitor circuit to apply voltage to each of the dielectric layers 10. Thus, the internal electrode layers 12 are made of a conductive material, such as Cu, Ni, Ag, Pd, Au, Pt, and an alloy containing at least one of these metal elements. Preferably, the conductive material contained in the internal electrode layers 12 is Ni or a Ni based alloy because the constituent material of the dielectric layers 10 has reduction resistance. When Ni or a Ni based alloy is the main component, one or more sub-components for internal electrodes selected from Mn, Cu, Cr, etc. may be contained.

In addition to the above-mentioned conductive material, the internal electrode layers 12 may contain a ceramic component contained in the dielectric layers 10 as an inhibitor and may contain a trace amount of non-metal components, such as S and P (e.g., about 0.1 mass % or less).

As shown in FIG. 1, each of the external electrodes 6 according to the present embodiment integrally includes an end surface part formed on the end surface 4a of the element body 4 in the X-axis direction and extension parts formed at the ends in the X-axis direction on the four end surfaces 4b of the element body 4. That is, each of the external electrodes 6 is formed so as to range from the end surface 4a to the end surfaces 4b of the element body 4. The external electrodes 6 are insulated so as not to contact with each other in the X-axis direction.

In the present embodiment, as mentioned above, the extension parts of the external electrodes 6 are formed on the four side surfaces 4b of the element body 4. However, the extension parts of the external electrodes 6 are not necessarily formed, and each of the external electrodes 6 may be formed from only the end surface part. Instead, when the multilayer ceramic capacitor 2 is surface-mounted on a substrate, the extension parts of the external electrodes 6 are formed at least on the side surface 4b facing a mounting surface of the substrate and are not necessarily formed on the side surface 4b opposite to the mounting surface.

Figure 2:
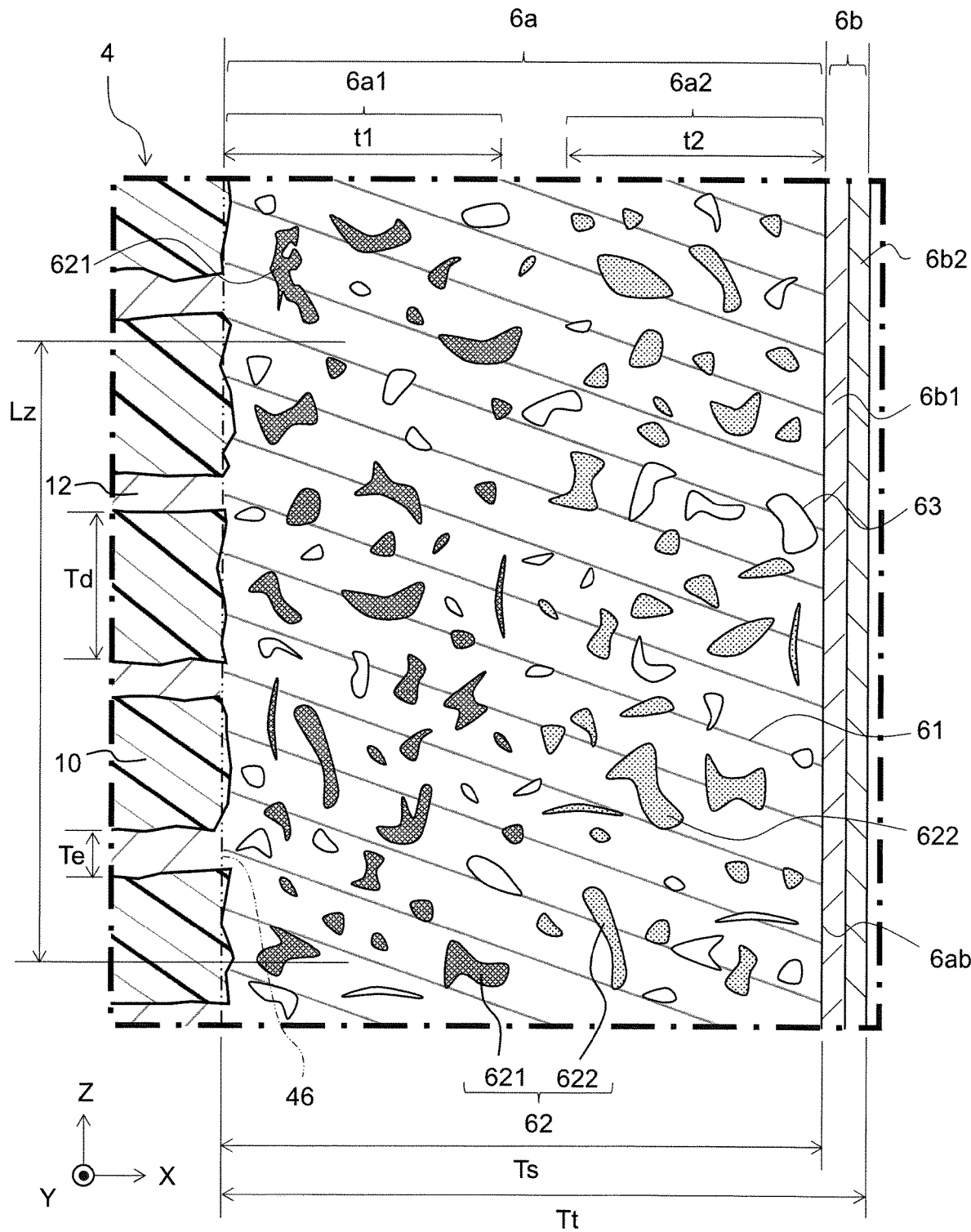
FIG. 2 is an enlarged cross-sectional view of a main part of the region II shown in FIG. 1.

FIG. 2 is an enlarged schematic cross-sectional view of a joint boundary 46 between the external electrode 6 and the element body 4. FIG. 2 illustrates one of the pair of external electrodes 6, but the other external electrode 6 has the same characteristics as the external electrode 6 shown in FIG. 2. Hereinafter, the detailed characteristics of the external electrodes 6 and the joint state between the external electrodes 6 and the element body 4 according to the present embodiment are explained based on FIG. 2.

As shown in FIG. 2, the external electrode 6 includes a baked electrode layer 6a including a conductor 61 and non-metal components 62, and the baked electrode layer 6a is in contact with the external surface (end surface 4a) of the element body 4.

The external electrode 6 may be configured by a single electrode layer or may be configured by laminating a plurality of electrode layers. Preferably, as shown in FIG. 2, the external electrode 6 includes a plating electrode layer 6b. The formation of the plating electrode layer 6b improves the solder wettability of the external electrode 6.

When the external electrode 6 is configured by a plurality of electrode layers, the baked electrode layer 6a is formed so as to be in contact with the external surface of the element body 4, and another baked electrode layer 6a, a resin electrode layer, a plating electrode layer, or the like is formed on the baked electrode layer 6a. FIG. 2 exemplifies the external electrode 6 having a triple-layer structure of the baked electrode layer 6a-a Ni plating layer 6b1-a Sn plating layer 6b2 (laminated in this order).

The average thickness Ts of the baked electrode layer 6a in contact with the end surface 4a can be 5-200 μm and is preferably 20-50 μm. When the external electrode 6 is configured by a plurality of layers, the average thickness Tt of the external electrode 6 can be about 5-300 μm and is preferably 100 μm or less.

In the present embodiment, the baked electrode layer 6a is divided into at least two regions and includes a first region 6a1 and a second region 6a2.

The first region 6a1 is in contact with the end surface 4a of the element body 4 and is located near the joint boundary 46, which is a boundary between the element body 4 and the baked electrode layer 6a. As shown in FIG. 2, the joint boundary 46 according to the present embodiment is not a strict boundary between the element body 4 and the baked electrode layer 6a, but is illustrated as a straight line substantially located in the boundary between the element body 4 and the baked electrode layer 6a.

Meanwhile, the second region 6a2 is located on the outside of the first region 6a1 and forms an external surface 6ab of the baked electrode layer 6a. That is, the second region 6a2 is a region near the external surface 6ab in contact with the plating electrode layer 6b.

Each of the first region 6a1 and the second region 6a2 is a part of the baked electrode layer 6a and includes the conductor 61 and the non-metal components 62 dispersed in the conductor 61. In the first region 6a1, a first glass 621 having a predetermined composition is dispersed as the non-metal components 62. In addition to the first glass 621, the non-metal components 62 of the first region 6a1 may include voids 63, oxide particles, or the like.

Meanwhile, a second glass 622 having a predetermined composition is dispersed as the non-metal components 62 in the second region 6a2. In addition to the second glass 622, the non-metal components 62 of the second region 6a2 may include voids 63, oxide particles, or the like.

Each of the first glass 621 and the second glass 622 is a glass containing B, Si, and Zn as a main component, but has different composition features as follows.

That is, in terms of oxide with $B_2O_3$ (oxide of B), $SiO_2$ (oxide of Si), and ZnO (oxide of Zn), a molar content rate of B in terms of oxide to a total molar content of B, Si, and Zn in terms of oxide in the first glass 621 is higher than a molar content rate of B in terms of oxide to a total molar content of B, Si, and Zn in terms of oxide in the second glass 622. Moreover, a molar content rate of Si in terms of oxide to a total molar content of B, Si, and Zn in terms of oxide in the first glass 621 is lower than a molar content rate of Si in terms of oxide to a total molar content of B, Si, and Zn in terms of oxide in the second glass 622. In the present embodiment, an oxide of B is $B_2O_3$ in terms of oxide, an oxide of Si is $SiO_2$ in terms of oxide, and an oxide of Zn is $ZnO_2$ in terms of oxide.

In the present embodiment, specifically, (SB/FB)<1 and (SSi/FSi)>1 are satisfied, and 0.4≤(SB/FB)≤0.8 and 1.2≤(SSi/FSi)≤3.2 are preferably satisfied, where "FB" is a molar content rate of B in terms of oxide in the first glass 621 to a total molar content of B, Si, and Zn in terms of oxide in the first glass 621, "FSi" is a molar content rate of Si in terms of oxide in the first glass 621 to a total molar content of B, Si, and Zn in terms of oxide in the first glass 621, "SB" is a molar content rate of B in terms of oxide in the second glass 622 to a total molar content of B, Si, and Zn in terms of oxide in the second glass 622, and "SSi" is a molar content rate of Si in terms of oxide in the second glass 622 to a total molar content of B, Si, and Zn in terms of oxide in the second glass 622. This improves the plating property of the baked electrode layer 6a and makes it possible to prevent the intrusion of plating into the element body 4.

"The first glass 621 includes B, Si, and Zn as a main component" means that the first glass 621 preferably contains 40 parts by mol or more (more preferably, 50 parts by mol or more) of B, Si, and Zn in total, provided that elements other than oxygen contained in the first glass 621 are 100 parts by mol.

"The second glass 622 includes B, Si, and Zn as a main component" means that the second glass 622 preferably contains 40 parts by mol or more (more preferably, 50 parts by mol or more) of B, Si, and Zn in total, provided that elements other than oxygen contained in the second glass 622 are 100 parts by mol.

The first glass 621 and the second glass 622 may contain B as $B_2O_3$, Si as $SiO_2$, and Zn as ZnO.

Preferably, the softening point of the first glass 621 is lower than the melting point of the conductor 61. In the present embodiment, the "melting point" means a temperature at which an oxide begins to melt and refers to a solidus temperature in a phase diagram. The melting point of Cu is 1085° C. When the above-mentioned first glass 621 is contained in the first region 6a1 in contact with the joint boundary 46, the sinterability of the baked electrode layer 6a is improved, and the first glass 621 spreads wet over the conductor 61 and between the conductor 61 and the element body 4 and is filled in the baked electrode layer 6a. This is considered to make it possible to densify the baked electrode layer 6a and enhance the binding of the baked electrode layer 6a to the element body 4.

In the present embodiment, the melting point of the conductor 61 is higher than the softening point of the first glass 621, and the softening point of the second glass 622 is higher than the melting point of the conductor 61. This is considered to prevent the deposition of the glass component on the outer surface 6ab.

The B content in terms of oxide in the first glass 621 is preferably 0.4-0.6 parts by mol and is more preferably 0.5-0.6 parts by mol, provided that the B, Si, and Zn content in terms of oxide in the first glass 621 is 1 part by mol.

The Si content in terms of oxide in the first glass 621 is preferably 0.15-0.35 parts by mol and is more preferably 0.20-0.30 parts by mol, provided that the B, Si, and Zn content in terms of oxide in the first glass 621 is 1 part by mol.

The Zn content in terms of oxide in the first glass 621 is preferably 0.1-0.35 parts by mol and is more preferably 0.20-0.30 parts by mol, provided that the B, Si, and Zn content in terms of oxide in the first glass 621 is 1 part by mol.

When the first glass 621 satisfies the above-mentioned composition ratios, the prevention effect on the intrusion of plating into the element body 4 is further enhanced. The softening point of the first glass 621 satisfying the above-mentioned composition ratios is 550-750° C.

In addition to the above-mentioned main component (B, Si, and Zn), preferably, the first glass 621 contains an A-site element constituting the perovskite compound of the dielectric layers 10. When the first glass 621 contains an A-site element, such as Ba, the bonding strength of the baked electrode layer 6a tends to be further improved.

The first glass 621 may contain Ba as a trace additive. Ba is an A-site element. The Ba content in terms of oxide in the first glass 621 is 0.2 parts by mol or less, provided that the B, Si, and Zn content in terms of oxide in the first glass 621 is 1 part by mol.

In addition, the first glass 621 may contain Al, Zr, Mn, Mg, Ti, K, Na, Ba, Sr, Ca, rare earth elements, etc.

In the present embodiment, the first glass 621 having a circle equivalent diameter of 1 μm or more is preferably confirmed by 0.002-0.020 pieces/μm$^2$ per unit area and is more preferably confirmed by 0.003-0.010 pieces/μm$^2$ per unit area in the range of the first region 6a1 of the X-Z cross section, and the second glass 622 having a circle equivalent diameter of 1 μm or more is preferably confirmed by 0.001 pieces/μm$^2$ or less in the range of the first region 6a1 of the X-Z cross section.

More preferably, the second glass 622 satisfies the following composition ratios.

The B content in terms of oxide in the second glass 622 is preferably 0.25-0.4 parts by mol and is more preferably 0.25-0.35 parts by mol, provided that the total content of B, Si, and Zn in terms of oxide in the second glass 622 is 1 part by mol.

The Si content in terms of oxide in the second glass 622 is preferably 0.4-0.6 parts by mol and is more preferably 0.4-0.57 parts by mol, provided that the total content of B, Si, and Zn in terms of oxide in the second glass 622 is 1 part by mol.

The Zn content in terms of oxide in the second glass 622 is preferably 0.1-0.35 parts by mol and is more preferably 0.1-0.33 parts by mol, provided that the total content of B, Si, and Zn in terms of oxide in the second glass 622 is 1 part by mol.

The second glass 622 may contain Ba as a trace additive. The Ba content in terms of oxide in the second glass 622 is 0.2 parts by mol or less, provided that the B, Si, and Zn content in terms of oxide in the second glass 622 is 1 part by mol.

The second glass 622 satisfying the above-mentioned composition is made of the same components as the first glass 621 and is thereby easy to join and contributes to the improvement in the sinterability and the bonding strength of the baked electrode layer 6a. Since the second glass 622 satisfying the above-mentioned composition has a high softening point, it is possible to more effectively prevent the deposition of the glass component on the outer surface 6ab of the baked electrode layer 6a, and the plating property of the baked electrode layer 6a is further improved. Specifically, the softening point of the second glass 622 satisfying the above-mentioned composition is 600-800° C.

In the present embodiment, the second glass 622 having a circle equivalent diameter of 1 μm or more is preferably confirmed by 0.003-0.030 pieces/μm$^2$ per unit area in the range of the second region 6a2 of the X-Z cross section, and the first glass 621 having a circle equivalent diameter of 1 μm or more is preferably confirmed by 0.001 pieces/μm$^2$ or less in the range of the second region 6a2 of the X-Z cross section.

As mentioned above, the second glass 622 may exist not only in the second region 6a2, but also in the first region 6a1. Likewise, the first glass 621 may exist in the second region 6a2. In particular, the first glass 621 and the second glass 622 may coexist in the boundary between the first region 6a1 and the second region 6a2.

However, preferably, the first glass 621 is not substantially exposed to the outer surface 6ab. In other words, preferably, the first glass 621 is not substantially in contact with the plating electrode layer 6b. More specifically, preferably, the contact points of the first glass 621 with the plating electrode layer 6b are one point/100 μm or less in a cross section of the baked electrode layer 6a as shown in FIG. 2.

Likewise, preferably, the second glass 622 is not substantially exposed to the joint boundary 46. In other words, preferably, the second glass 622 is not substantially in contact with the element body 4. More specifically, preferably, the contact points of the second glass 622 with the joint boundary 46 are one point/100 μm or less in a cross section of the baked electrode layer 6a as shown in FIG. 2.

The number of contact points mentioned above can be measured by counting the number of contact points contained in a length of 100 μm of the outer surface 6ab in an observation of a cross section taken by SEM or the like. The length of the outer surface 6ab means the length of the boundary line between the baked electrode layer 6a and the plating electrode layer 6b, and the boundary line may be meandering or partially unclear. When the number of contact points is counted, it is not necessary to accurately count the meandering points, unclear points, or the like of the boundary line. The cross section is photographed so that the boundary line (outer surface 6ab) and one side of the cross-sectional photograph are substantially parallel to each other, and the width of the cross-sectional photograph is regarded as the length of the boundary line (the length of the outer surface 6ab).

The conductor 61 of the first region 6a1 and the conductor 61 of the second region 6a2 may have different compositions, but preferably have the same composition. The conductor 61 of the baked electrode layer 6a contains at least one of Cu and Cu alloys as a main component. When the conductor 61 is a Cu alloy, the conductor 61 may contain elements of Al, Ni, Ag, Pd, Sn, Zn, P, Fe, Mn, etc. in addition to Cu. Preferably, the amount of elements other than Cu is 5 parts by mol or less to 100 parts by mol of Cu.

The main component of the conductor 61 of the baked electrode layer 6a is a component contained in the conductor 61 of the baked electrode layer 6a by 90 mass % or more.

In the baked electrode layer 6a, preferably, an average of a ratio (N/M) of a total area (N) of the non-metal components 62 and the voids 63 to a unit cross-sectional area (M) of the baked electrode layer 6a is 0.10-0.45. Here, the "non-metal components 62" also include the first glass 621 and the second glass 622. In addition, the "non-metal components 62" also include a metal oxide. In addition, the "non-metal components 62" also include interface protrusions 16 mentioned below. When N/M is within the above-mentioned range, the plating property of the bake electrode layer 6a is further improved, and the prevention effect on the intrusion of plating into the element body 4 is further enhanced.

Preferably, the "unit cross-sectional area" is an area at least from the vicinity of the joint boundary 46 to the vicinity of the outer surface 6ab.

N/M is adjusted by any method and may be adjusted by a mixing ratio of the non-metal components 62 to be added to each conductive paste or by a mixing ratio of a binder to be added to each conductive paste.

In the present embodiment, the size of the voids 63 in the second region 6a2 is larger than the size of the voids 63 in the first region 6a1. Specifically, preferably, a ratio (D1/D2) of an average circle equivalent diameter (D1) of the voids 63 in the first region 6a1 to an average circle equivalent diameter (D2) of the voids 63 in the second region 6a2 is 0.8 or less.

As a result, the plating easily enters the voids 63 in the second region 6a2, the baked electrode layer 6a and the Ni plating layer 6b1 can be easily firmly connected, and the intrusion of plating into the element body 4 can be prevented.

The external electrode 6 can be analyzed by a cross-sectional observation using a scanning electron microscope (SEM), a scanning transmission electron microscope (STEM), or the like. The compositions of the conductor 61, the first glass 621, and the second glass 622 can be measured by performing a component analysis with an electron probe microanalyzer (EPMA) in the cross-sectional observation. In the present embodiment, when a component analysis or the like is performed by EPMA, an energy dispersion type spectroscope (EDS) or a wavelength dispersion type spectroscope (WDS) can be used as the X-ray spectroscope. Preferably, the component analysis is performed at least at three points, and the composition of each element (61, 621, and 622) is calculated from an average of the measurement results.

For example, a ratio (N/M) of a total area (N) of the non-metal components 62 and the voids 63 to a unit cross-sectional area (M) of the baked electrode layer 6a can be measured by performing an image analysis of a cross-sectional photograph obtained by a cross-sectional observation with SEM, STEM, or the like. When a cross section of the baked electrode layer 6a is observed with a backscattered electron image of SEM, a HAADF image of STEM, or the like, the conductor 61, which is often denser than other parts, can often be recognized as a bright contrast part, and the non-metal components 62, such as the first glass 621 and the second glass 622, the voids 63, and the like can often be recognized as a dark contrast part. Thus, N/M can often be calculated as a ratio of an area of the dark contrast part to an area of the entire measurement visual field by, for example, binarizing the cross-sectional photograph.

Specifically, an average of N/M is obtained in the following manner. The unit cross-sectional area (M) is an area at least from the vicinity of the joint boundary 46 to the vicinity of the outer surface 6ab in the X-Z cross section. The total area (N) of the metal components 62 and the voids 63 is obtained for the unit cross-sectional area at five points to calculate an average of N/M.

In the above-mentioned cross-sectional observation, a boundary may be visible or may not be visible between the first region 6a1 and the second region 6a2. Thus, a thickness (layer thickness) (t1) of the first region 6a1 measured from the joint boundary 46 of the first region 6a1 toward the outside in the X-axis direction and a thickness (layer thickness) (t2) of the second region 6a2 measured from the outer surface 6ab toward the inside in the X-axis direction are determined, for example, in the following manner.

In a predetermined range of the X-Z cross section in the Z-axis direction, the non-metal components 62 are sequentially subjected to a component analysis from the joint boundary 46 to the outer surface 6ab approximately along the X-axis direction at, preferably, 10 or more points. The predetermined range in the Z-axis direction is not limited and is, for example, 5-10 μm. For each of the non-metal components 62, the component analysis is performed at three points to calculate an average.

Then, a molar content rate of B (hereinafter, referred to as a "B content rate") in terms of oxide and a molar content rate of Si (hereinafter, referred to as a "Si content rate") in terms of oxide at each point to a total molar content of B, Si, and Zn in terms of oxide from the joint boundary 46 to the outer surface 6ab in the X-axis direction are calculated.

Next, the "point that satisfies B content rate <Si content rate and is the farthest from the joint boundary 46" is determined. Then, the distance from the "point that satisfies B content rate <Si content rate and is the farthest from the joint boundary 46" to the joint boundary 46 is determined as t01. This operation is performed in 10 different visual fields to obtain an average of t01, and the average of t01 is defined as a thickness (t1) of the first region 6a1.

Next, the "point that satisfies B content rate >Si content rate and is the farthest from the outer surface 6ab" is determined. Then, the distance from the "point that satisfies B content rate >Si content rate and is the farthest from the outer surface 6ab" to the outer surface 6ab is determined as t02. This operation is performed in 10 different visual fields to obtain an average of t02, and the average of t02 is defined as a thickness (t2) of the second region 6a2.

The ratio (t2/Ts) of the average thickness (t2) of the second region 6a2 to the average thickness (Ts) of the baked electrode layer 6a is preferably 0.12-0.87 and is more preferably 0.22-0.78.

Next, a method of manufacturing the multilayer ceramic capacitor 2 shown in FIG. 1 is explained.

First, a manufacturing process of the element body 4 is explained. In the manufacturing process of the element body 4, a dielectric-layer paste to be the dielectric layers 10 after firing and an internal-electrode-layer paste to be the internal electrode layers 12 after firing are prepared.

The dielectric-layer paste is prepared, for example, in the following manner. First, dielectric raw materials are uniformly mixed by means such as wet mixing, dried, and thereafter subjected to a heat treatment under predetermined conditions to obtain a calcined powder. Next, a known organic vehicle or a known water based vehicle is added to the obtained calcined powder and kneaded to prepare a dielectric-layer paste. The dielectric-layer paste thus obtained is turned into sheets by a method such as a doctor blade method to obtain ceramic green sheets. If necessary, the dielectric-layer paste may contain an additive selected from various dispersants, plasticizers, dielectrics, sub-component compounds, glass frit, and the like.

Meanwhile, an internal-electrode-layer paste is prepared by kneading a conductive powder made of a conductive metal or an alloy thereof with a known binder or solvent. If necessary, the internal-electrode-layer paste may contain a ceramic powder (e.g., barium titanate powder, calcium zirconate strontium powder) as an inhibitor. The inhibitor has an effect of preventing the sintering of the conductive powder in the firing step.

Next, the internal-electrode-layer paste is applied on the ceramic green sheets in a predetermined pattern by various printing methods, such as screen printing, or a transfer method. Then, the green sheets with the internal electrode pattern are laminated and pressed in the lamination direction to obtain a mother laminated body. At this time, the ceramic green sheets and the internal electrode patterns are laminated so that the ceramic green sheets are located on the upper surface and the lower surface of the mother laminated body in the lamination direction.

The mother laminated body obtained by the above-mentioned step is cut into a predetermined size by dicing or push-cutting to obtain a plurality of green chips. If necessary, the green chips may be solidified and dried so as to remove the plasticizer and the like and may be subjected to a barrel polishing using a horizontal centrifugal barrel machine or the like after the solidification and drying. In the barrel polishing, unnecessary parts, such as burrs, generated during the cutting are polished by putting the green chips into a barrel container together with a medium and a polishing liquid and applying a rotational movement or vibration to the barrel container. The green chips after the barrel polishing are washed with a cleaning solution, such as water, and dried.

Next, the green chips obtained above are subjected to a binder removal treatment and a firing treatment to obtain the element body 4.

The conditions for the binder removal treatment are appropriately determined based on the main component composition of the dielectric layers 10 and the main component composition of the internal electrode layers 12 and are not limited. For example, the heating rate is preferably 5-300° C./hour, the holding temperature is preferably 180-400° C., and the temperature holding time is preferably 0.5-24 hours. The binder removal atmosphere is the air or a reducing atmosphere.

The conditions for the firing treatment is appropriately determined based on the main component composition of the dielectric layers 10 and the main component composition of the internal electrode layers 12 and are not limited. For example, the holding temperature during firing is preferably 1200-1400° C., more preferably 1220-1300° C., and the holding time is preferably 0.5-8 hours, more preferably 1-3 hours. The heating rate of and the cooling rate (temperature drop rate) are preferably 50-500° C./hour. The firing atmosphere is preferably a reducing atmosphere. As the atmospheric gas, for example, a mixed gas of $N_2$ and $H_2$ can be humidified and used. When the internal electrode layers 12 are made of a base metal, such as Ni and Ni alloys, the oxygen partial pressure in the firing atmosphere is preferably $1.0 \times 10^{-14}$ to $10^{-10}$ MPa.

After the firing treatment, if necessary, annealing may be performed. Annealing is a treatment for reoxidizing the dielectric layers 10. When the firing treatment is carried out in a reducing atmosphere, annealing is preferably performed. The conditions for the annealing treatment are appropriately determined based on the main component composition of the dielectric layers 10 and the like and are not limited. For example, the holding temperature is preferably 950-1150° C., the temperature holding time is preferably 0-20 hours, and the heating rate and the cooling rate are preferably 50-500° C./hour. Preferably, a humidified $N_2$ gas or the like is used as the atmospheric gas, and the oxygen partial pressure in the annealing atmosphere is $1.0 \times 10^{-9}$ to $1.0 \times 10^{-5}$ MPa.

In the above-mentioned binder removal treatment, firing treatment, and annealing treatment, for example, a wetter is used to humidify the $N_2$ gas, the mixed gas, and the like. In this case, the water temperature is preferably about 5-75° C. The binder removal treatment, the firing treatment, and the annealing treatment may be performed continuously or independently.

Next, the baked electrode layer 6a is formed on the outer surface of the element body 4 obtained above. In the formation of the baked electrode layer 6a, first, a first conductive paste for forming the first region 6a1 and a second conductive paste for forming the second region 6a2 are prepared. The first conductive paste contains a metal powder to be the conductor 61 after the baking treatment and the first glass 621. Meanwhile, the second conductive paste contains a metal powder to be the conductor 61 after the baking treatment and a powder of the second glass 622. In addition, the first conductive paste and the second conductive paste may appropriately contain sub-component raw materials, such as binder, solvent, dispersant, plasticizer, and oxide powder.

For example, the first glass 621 can be manufactured by mixing starting raw materials of ZnO powder, $SiO_2$ powder, $B_2O_3$ powder, $BaCO_3$ powder, and other oxide powders in a predetermined ratio, putting the mixture into a crucible, putting it into a furnace, heating and melting it, taking it out of the furnace using a tong in the molten state, tilting the crucible and putting the molten material into water so as to rapidly cooling it, crushing it in a mortar, and then pulverizing it to a predetermined particle size using a ball mill or the like. The composition of the first glass 621 is adjusted by the mixing ratio of the starting raw materials. The second glass 622 can also be manufactured by mixing starting raw materials of ZnO powder, $SiO_2$ powder, $B_2O_3$ powder, $BaCO_3$ powder, and other oxide powders in a predetermined ratio, putting the mixture into a crucible, putting it into a furnace, heating and melting it, taking it out of the furnace using a tong in the molten state, tilting the crucible and putting the molten material into water so as to rapidly cooling it, crushing it in a mortar, and then pulverizing it to a predetermined particle size using a ball mill or the like. The composition of the second glass 622 is adjusted by the mixing ratio of the starting raw materials.

The binder, solvent, and dispersant used for each conductive paste are not limited and can be materials similar to those of the dielectric-layer paste. For example, the binder can be appropriately selected from various normal binders, such as acrylic, butyral, and ethyl cellulose, and the solvent can be appropriately selected from various organic solvents, such as alcohol, methyl ethyl ketone, acetone, toluene, tarpineol, and butyl carbitol, and water based solvents.

After preparing the above-mentioned two types of conductive pastes, the first conductive paste is applied to the outer surface of the element body 4 by a dipping method or a printing method and dried. Then, the first conductive paste is baked by holding the element body 4 at a temperature of 700-1000° C. for 0.1-3 hours. Then, the second conductive paste is applied onto the baked first conductive paste by a dipping method or a printing method and dried. Then, the second conductive paste is subjected to a baking treatment by holding the element body 4 at a temperature of 700-1000° C. for 0.1-3 hours. As a result, the baked electrode layer 6a including predetermined first region 6a1 and second region 6a2 can be formed. In the above-mentioned manner, the first conductive paste and the second conductive paste are separately subjected to a baking treatment, but the pastes may be subjected to a baking treatment at the same time.

After the baked electrode layer 6a is formed, the plating electrode layer 6b can be formed on the baked electrode layer 6a by performing a plating treatment, such as electrolytic plating and electroless plating. A resin electrode may be formed on the baked electrode layer 6a. In this case, a resin-electrode conductive paste containing a thermosetting resin is applied by a dipping method, a printing method, or the like so as to cover the baked electrode layer 6a and thereafter subjected to a curing treatment. A plating electrode layer may further be formed on the resin electrode.

After the above-mentioned steps, the multilayer ceramic capacitor 2 including the external electrodes 6 is obtained.

The obtained multilayer ceramic capacitor 2 can be surface-mounted on a substrate, such as a printed wiring board, using solder (including molten solder, solder cream, and solder paste) or a conductive adhesive and can be used in various electronics. Instead, the multilayer ceramic capacitor 2 can be mounted on a substrate via a wire-shaped lead terminal or a plate-shaped metal terminal.

The multilayer ceramic capacitor 2 according to the present embodiment includes the baked electrode layer 6a. The baked electrode layer 6a includes the first region 6a1 in contact with the end surface 4a of the element body 4 and the second region 6a2 in contact with the plating electrode layer 6b. The first region 6a1 includes the first glass 621 containing predetermined elements. The second region 6a2 includes the second glass 622 containing predetermined elements.

The present inventors have found that the multilayer ceramic capacitor 2 having the above-mentioned configurations improves the plating property of the baked electrode layer 6a and can prevent the intrusion of plating into the element body 4.

The reason why the above-mentioned effects are obtained is not necessarily clear, but the following reasons can be considered.

First, in the present embodiment, the second region 6a2 including the second glass 622 exists on the outer surface 6ab of the baked electrode layer 6a in contact with the plating electrode layer 6b. The second glass 622 according to the present embodiment has a comparatively high softening point. It is thus considered that the existence of the second glass 622 in the vicinity of the outer surface 6ab can prevent the deposition of the second glass 622 on the outer surface 6ab of the baked electrode layer 6a. As a result, it is considered that the generation of plating defects can be prevented in the formation of the plating electrode layer 6b on the baked electrode layer 6a.

In the present embodiment, the first glass 621 containing predetermined elements is contained in the first region 6a1 to be bonded with the end surface 4a of the element body 4. The first glass 621 softens during baking to enter the conductor 61 and between the conductor 61 and the end surface 4a and is filled in the vicinity of the element body 4 of the baked electrode layer 6a to densify the structure of the baked electrode layer 6a. As a result, it is considered that the intrusion of plating into the element body 4 can be prevented, and that the bonding strength of the baked electrode layer 6a to the element body 4 is improved. As a result, the multilayer ceramic capacitor 2 can prevent the external electrode 6 from peeling from the end surface 4a of the element body 4 even if receiving a thermal shock.

The plating solution is acidic. Thus, if the plating intrudes the element body 4, the Ni internal electrode layers 12 are easily corroded. In this case, the interface between the dielectric layers 10 and the internal electrode layers 12 is particularly easily corroded. When the main component of the dielectric layers 10 is $(Ca, Sr)ZrO_3$ or $(Ca, Sr)(Ti, Zr)O_3$, the dielectric layers 10 are harder than when the main component of the dielectric layers 10 is $BaTiO_3$, and the difference in linear expansion coefficient from the Ni internal electrode layers 12 is large. Thus, when the main component of the dielectric layers 10 is $(Ca, Sr)ZrO_3$ or $(Ca, Sr)(Ti, Zr)O_3$, the intrusion of the plating solution into the element body 4 is considered to peel the interface between the Ni internal electrode layers 12 and the dielectric layers 10 due to corrosion of the Ni internal electrode layers 12, so that cracks are likely to occur.

On the other hand, according to the present embodiment, since the intrusion of plating into the element body 4 can be prevented, the generation of cracks can be prevented even if the main component of the dielectric layers 10 is $(Ca, Sr)ZrO_3$ or $(Ca, Sr)(Ti, Zr)O_3$.

In addition, the plating solution is acidic and thus contains hydrogen ions. The intrusion of hydrogen ions into the element body 4 may decrease the electrical resistance of the capacitor. In particular, when the main component of the dielectric layers 10 is $BaTiO_3$, hydrogen ions are more likely to permeate the element body 10 than when the main component of the dielectric layers 10 is $(Ca, Sr)ZrO_3$.

On the other hand, according to the present embodiment, since the intrusion of plating into the element body 4 can be prevented, the decrease in the electric resistance of the capacitor can be prevented even if the main component of the dielectric layers 10 is $BaTiO_3$.

In particular, since the first glass 621 and the second glass 622 satisfy a predetermined composition ratio, the plating property of the baked electrode layer 6a and the prevention effect on the intrusion of plating into the element body 4 are more favorably compatible.

Second Embodiment

Except for the following respects, a multilayer ceramic capacitor according to the present embodiment is similar to the multilayer ceramic capacitor according to First Embodiment.

Figure 3:
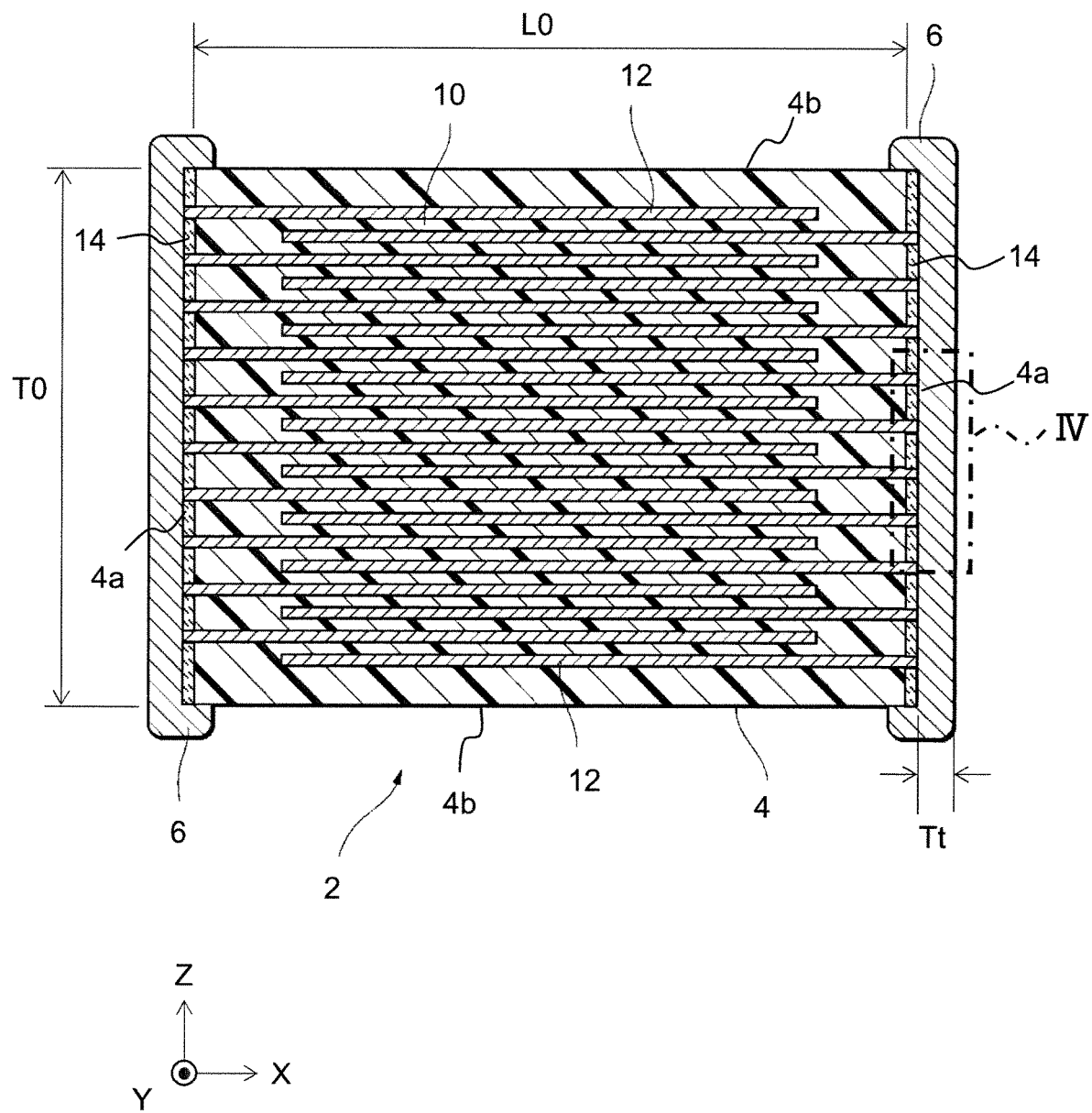
FIG. 3 is a cross-sectional view of a multilayer ceramic capacitor according to an embodiment of the present invention.

As shown in FIG. 3, the element body 4 according to the present embodiment may include the boundary layers 14 at the ends of the dielectric layers 10 in the X-axis direction. The boundary layers 14 may be provided so as to be in contact with the internal electrode layers 12.

Each of the boundary layers 14 intermittently covers the end surface of the element body 4 in the X-axis direction so that the external electrode 6 and the internal electrode layers 12 are connected. That is, each of the boundary layers 14 is partly disconnected at the connection points between the ends of the internal electrode layers 12 in the X-axis direction and the external electrode 6.

The connection interface between each of the external electrodes 6 and the internal electrode layers 12 is not necessarily clear. The external electrode 6 may partly enter the boundary layer 14. The ends of the internal electrode layers 12 may enter each of the boundary layers 14.

When an X-Z cross section is observed, the point where each of the boundary layers 14 covers the ends of a part of the internal electrode layers 12 in the X-axis direction may exist near the end surface of the element body 4 in the X-axis direction. Each of the internal electrode layers 12 exists along not only the X-axis direction, but along the Y-axis direction. As long as the end of each of the internal electrode layers 12 even partly penetrates the boundary layer 14 in the Y-axis direction and is electrically conducted with the external electrode 6, each of the internal electrode layers 12 and the external electrode 6 can electrically be connected even if the ends of the internal electrode layers 12 are partly covered with the boundary layer 14.

Each of the boundary layers 14 according to the present embodiment includes an A-site element and a B-site element as a main component.

"Each of the boundary layers 14 includes an A-site element and a B-site element as a main component" means that the total of the A-site element and the B-site element occupies 90 parts by mol or more in each of the boundary layers 14, provided that the total of elements other than oxygen is 100 parts by mol.

The A-site element contained in each of the boundary layers 14 is not limited and may be Ba. The B-site element contained in each of the boundary layers is not limited and may be Ti.

In the present embodiment, when the total of Ba and Ti included in each of the boundary layers 14 is 1 part by mol, each of the boundary layers 14 preferably includes 0.27–0.40 parts by mol of Ba. In this case, each of the boundary layer 14 tends to have a linear expansion coefficient γ of 13.0 ppm/° C. to 14.5 ppm/° C. In the present embodiment, more preferably, each of the boundary layers 14 is $BaTi_2O_5$.

Preferably, a magnitude correlation between α, β, and γ satisfies β>γ>α, where α is a linear expansion coefficient of the dielectric layers 10, β is a linear expansion coefficient of the external electrodes 6.

For example, the linear expansion coefficient α of $BaTiO_3$ (the main component of the dielectric layers 10) is 9.4 ppm/° C., the linear expansion coefficient β of Cu used for the external electrodes 6 is 17.5 ppm/° C., and the linear expansion coefficient γ of $BaTi_2O_5$ constituting the boundary layers 14 is 13.3 ppm/° C.

Preferably, a magnitude correlation between α, β, γ, and σ satisfies β>γ>σ>α, where σ is a linear expansion coefficient of the internal electrode layers 12.

Figure 4:
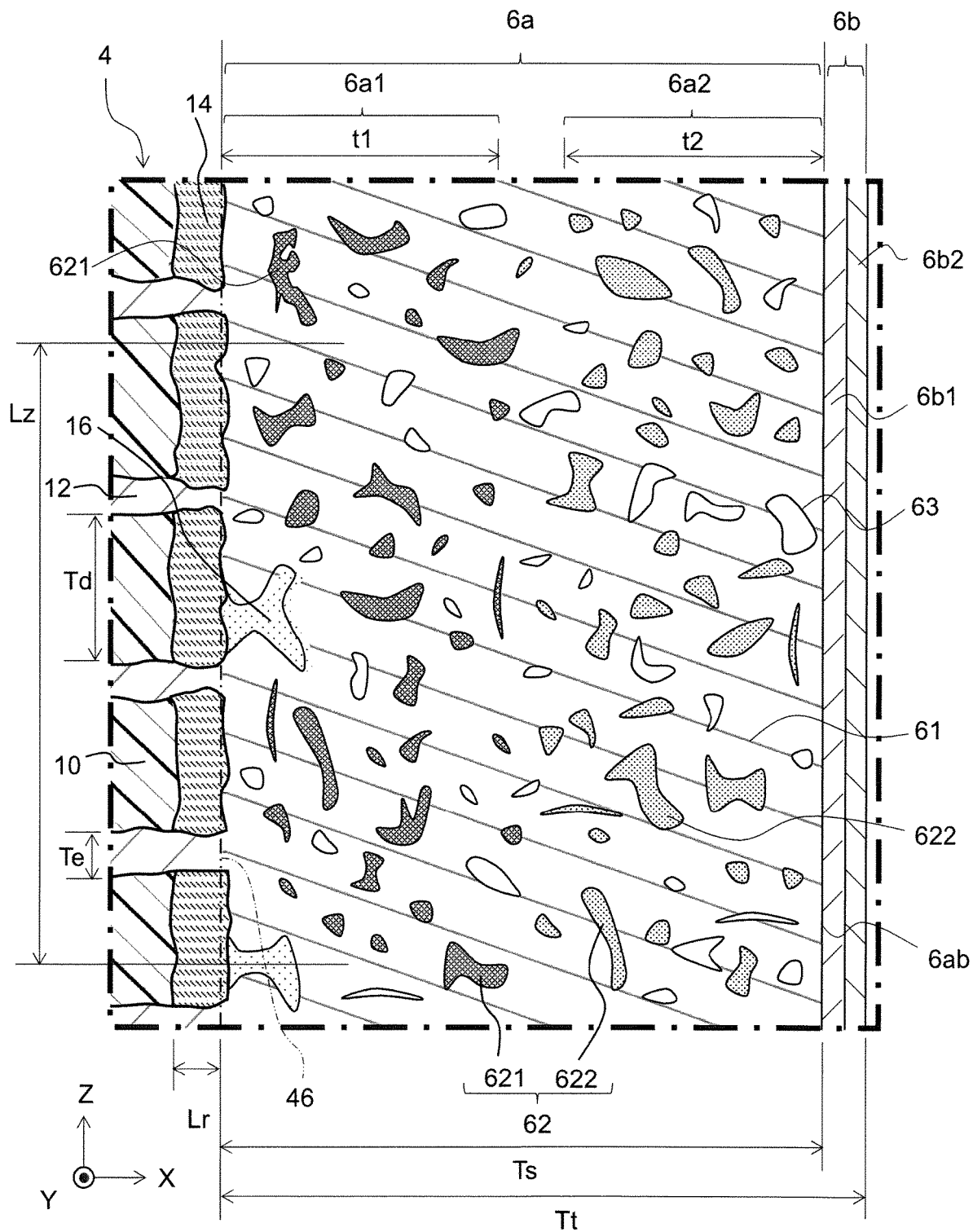
FIG. 4 is an enlarged cross-sectional view of a main part of the region IV shown in FIG. 3.

FIG. 4 is an enlarged view of the IV part of FIG. 3. As shown in FIG. 4, the multilayer ceramic capacitor 2 according to the present embodiment may include amorphous interface protrusions 16 connected to the boundary layer 14 formed at the ends of the dielectric layers 10 in the X-axis direction and formed by biting into the inside of the external electrode 6.

Preferably, each of the interface protrusions 16 according to the present embodiment has a shape that exhibits an anchor effect. The "shape that exhibits an anchor effect" means that the interface protrusions 16 do not spread thinly along the outer surface (Y-Z plane) of each of the boundary layers 14, but spread three-dimensionally from the outer surface of each of the boundary layers 14 toward the inside of each of the external electrodes 6 (i.e., outward in the X-axis direction) as shown in FIG. 4.

As shown in FIG. 4, preferably, each of the interface protrusions 16 has a constriction in the X-axis direction. Such a shape can be achieved by, for example, controlling the shapes of interface-protrusion particles added to an interface-protrusion paste. Since the shapes of the interface protrusions 16 have the above-mentioned characteristics, the bonding strength of the external electrodes 6 to the element body 4 is further improved.

Preferably, a predetermined number or more of interface protrusions 16 are present in a predetermined length Lz in the Z-axis direction in the vicinity of the interface between the element body 4 and each of the external electrodes 6. Specifically, in a cross section including the vicinity of the interface between the element body 4 and each of the external electrodes 6 (X-Z cross section), 2 more interface protrusions 16 are preferably present, and 10 or more interface protrusions 16 are more preferably present, when the predetermined length Lz is 100 μm. The upper limit of the number of interface protrusions 16 is not limited, but is preferably 15 or less from the viewpoint of ensuring the electrical connection between the internal electrode layers 12 and each of the external electrodes 6.

The predetermined length Lz is a distance between two points in the vicinity of the interface between the element body 4 and each of the external electrodes 6. Thus, when the interface between the element body 4 and each of the external electrodes 6 has irregularities, the predetermined length Lz is not the length of the irregularities, but is a distance between two points determined on the irregularities.

The interface protrusions 16 according to the present embodiment include the A-site element, the B-site element, and Si as a main component.

"The interface protrusions 16 include the A-site element, the B-site element, and Si as a main component" means that the total of the A-site element, the B-site element, and Si occupies 90 parts by mol or more in the interface protrusions 16, provided that the total of elements other than oxygen is 100 parts by mol.

The A-site element contained in the interface protrusions 16 is not limited and may be Ba. The B-site element contained in the interface protrusions 16 is not limited and may be Ti.

In the present embodiment, preferably, the interface protrusions 16 include 0.35-0.45 parts by mol of Ba, provided that the total of Ba, Ti, and Si contained in the interface protrusions 16 is 1 part by mol.

In the present embodiment, preferably, the interface protrusions 16 include 0.10-0.30 parts by mol of Ti, provided that the total of Ba, Ti, and Si contained in the interface protrusions 16 is 1 part by mol.

In the present embodiment, preferably, the interface protrusions 16 include 0.35-0.45 parts by mol of Si, provided that the total of Ba, Ti, and Si contained in the interface protrusions 16 is 1 part by mol.

In the present embodiment, more preferably, the composition of the interface protrusions 16 is $Ba_2Ti(SiO_4)_2$.

Preferably, a magnitude correlation between α, β, γ, and δ satisfies β>γ>α>δ, where δ is a linear expansion coefficient of the interface protrusions 16 according to the present embodiment.

For example, the linear expansion coefficient δ of $Ba_2Ti(SiO_4)_2$, which is a main component of the interface protrusions 16, is 5.9 ppm/° C.

The structures of the boundary layers 14 and the interface protrusions 16 can be analyzed by cross-sectional observation by SEM, STEM, or the like. The compositions of the boundary layers 14 and the interface protrusions 16 can be measured by performing a component analysis by EPMA in the cross-sectional observation. Preferably, the component analysis is performed at least at three points, and the composition of the boundary layers 14 is calculated from an average of the measurement results.

The boundary layers 14 can be formed by subjecting the first conductive paste to a high-temperature baking treatment or by using a boundary-layer paste. Preferably, the boundary-layer paste is used. The boundary layers 14 may be formed by ceramic coating with various vapor deposition methods without using a paste.

When a high-temperature baking treatment is employed, the holding temperature is preferably 800-1000° C., and the holding time is preferably 0.1-3 hours. The boundary layers 14 are formed by baking the first conductive paste at a higher temperature than a normal baking treatment or by baking the first conductive paste over a long period of time.

When a boundary-layer paste is employed, the boundary layers 14 can be formed by applying a boundary-layer paste onto the outer surfaces of green chips before firing or the outer surface of the element body 4 after firing and baking it.

In this case, the boundary-layer paste contains a boundary-layer powder, a binder, and a solvent, and if necessary, a dispersant, a plasticizer, or the like may be added. The boundary-layer powder is obtained by mixing $BaCO_3$ powder and starting raw materials, such as $BaCO_3$ powder and $TiO_2$ powder, in a predetermined ratio, and then calcining and pulverizing the mixture.

The boundary-layer paste can be applied to the green chips or the element body 4 by various printing methods, such as a dip method and screen printing, a coating method using a dispenser or the like, a spraying method using a spray, or the like. The boundary-layer paste is applied to at least the end surface 4a and may be applied to a part of the side surface 4b. At this time, the average length Lr (average thickness) of the boundary layer 14 can be adjusted by controlling the application amount of the boundary-layer paste.

When the boundary-layer paste is applied to the element body 4, the boundary layers 14 are formed by drying the boundary-layer paste after application and subjecting it to a baking treatment at a temperature of 700-1000° C. for 0.1-3 hours. In this case, the boundary-layer paste may be baked at the same time as baking the first conductive paste. The average length Lr of the boundary layer 14 is also affected by the conditions of the baking treatment. If the temperature during the baking treatment is low or the holding time is short, the average length Lr tends to be small (the average thickness becomes small). In addition, the average length Lr may be affected by the application thickness of the boundary layer-paste. When the boundary-layer paste is applied to the green chips, the boundary-layer paste is baked at the time of firing the green chips.

When the boundary layers 14 are formed using a paste, the element body 4 is preferably subjected to a barrel polishing before applying the paste and/or after baking the paste. In the barrel polishing, the ceramic component (dielectric layers 10 or boundary layers 14) is selectively polished rather than the ends of the internal electrode layers 12, and the ends of the internal electrode layers 12 are easily exposed on the outermost surface of the end surface 4a. That is, the barrel polishing improves the electrical bonding of the internal electrode layers 12 to the external electrode 6.

Even when the boundary-layer paste and the first conductive paste are baked at the same time, the baked electrode layer 6a and the internal electrode layers 12 can be electrically connected. This is because an oxide of the A-site element and/or an oxide of the B-site element constituting the boundary layers 14 and $ABO_3$ constituting the dielectric layers 10 react with each other after the conductive material of the internal electrode layers 12 and the conductor 61 of the baked electrode layer 6a react with each other, and it is thereby difficult to form the oxide from the boundary-layer paste at the ends of the internal electrode layers 12 in the X-axis direction When the interface protrusions 16 are provided, the multilayer ceramic capacitor 2 according to the present embodiment can be manufactured similarly to the above except for using an interface-protrusion paste containing a compound (interface-protrusion particles) constituting the interface protrusions 16 and a metal powder constituting the conductor 61. The "interface-protrusion particles" are preferably a compound satisfying the above-mentioned composition of the interface protrusions 16 and are, for example, $Ba_2Ti(SiO_4)_2$.

In the present embodiment, for example, a boundary-layer paste is applied to the fired element body 4, an interface-protrusion paste is applied thereto, a first conductive paste is applied thereto, a second conductive paste is applied thereto, and the boundary-layer paste, the interface-protrusion paste, the first conductive paste, and the second conductive paste are baked at the same time. The baking temperature is not limited, but is 800-1000° C.

Even in this case, the external electrodes 6 and the internal electrode layers 12 can electrically be conducted with each other. This is because $Ba_2Ti(SiO_4)_2$ or the like constituting the interface protrusions 16, $BaTi_2O_5$ or the like constituting the boundary layers 14, and $ABO_3$ constituting the dielectric layers 10 react with each other after the conductive material of the internal electrode layers 12 and the conductor 61 of the external electrodes 6 react with each other, and it is thereby difficult to form the oxide from the boundary-layer paste at the ends of the internal electrode layers 12 in the X-axis direction.

In the present embodiment, since the boundary layers 14 are provided, it is possible to effectively prevent the thermal stress generated on the interfaces between the external electrodes 6 and the dielectric layers 10 due to, for example, thermal shock during cooling in the baking, during manufacturing, during use, or the like. The reason is considered to be as follows.

In the present embodiment, the dielectric layers 10 include a perovskite compound represented by $ABO_3$ as a main component, and the element body 4 includes the boundary layers 14 containing an A-site element and a B-site element in a predetermined molar ratio at the ends of the dielectric layers 10. Thus, it is considered that the dielectric layers 10 and the boundary layers 14 are easy to be diffused to each other, and that the dielectric layers 10 and the boundary layers 14 are firmly bonded to each other.

It is further considered that the B-site element content is higher than the A-site element content in the boundary layers 14, and the external electrodes 6 and the boundary layers 14 are thereby firmly bonded to each other.

In the present embodiment, since the external electrodes 6 and the boundary layers 14 are firmly bonded as well as the dielectric layers 10 and the boundary layers 14 are firmly bonded, the element body 4 and the external electrodes 6 are firmly bonded. The fact that the bonding strength is high can be confirmed by, for example, tensile strength test.

In addition, when the conductor of the baked electrode layer 6a of the external electrode 6 includes at least one of Cu and Cu alloys as a main component, a linear expansion coefficient γ of the boundary layers 14 is smaller than a linear expansion coefficient β of the external electrodes 6 and larger than a linear expansion coefficient α of the dielectric layers 10. In the present invention, it is considered that the inclusion of the boundary layers 14 can reduce the thermal stress generated on the interfaces between the external electrodes 6 and the dielectric layers 10 and can further increase the bonding strength between the dielectric layers 10 and the external electrodes 6.

When the internal electrode layers 12 include Ni or Ni alloy as a main component, a magnitude correlation between α, γ, and σ satisfies γ>σ>α, where α is a linear expansion coefficient of the dielectric layers 10, γ is a linear expansion coefficient of the boundary layers 14, and σ is a linear expansion coefficient of the internal electrode layers 12. In the present embodiment, the boundary layers 14 are provided so as to contact with the internal electrode layers 12. Thus, the boundary layers 14 having a linear expansion coefficient closer to that of the internal electrode layer 12 are in contact with the internal electrode layers 12, and the effect of preventing the peeling of the dielectric layers 10 and the internal electrode layers 12 near the surface of the element body 4 is enhanced.

When the A-site element and the B-site element are contained in both of the boundary layers 14 and the interface protrusions 16, the A-site element and the B-site element are easier to be diffused to each other, so that the boundary layers 14 and the interface protrusions 16 are more firmly bonded to each other.

In the present embodiment, since both of the interface protrusions 16 and the first glass 621 are oxides, the interface protrusions 16 and the baked electrode layer 6a containing the first glass are easy to get wet with each other, and the interface protrusions 16 and the baked electrode layer 6a containing the first glass 621 are firmly bonded to each other.

The interface protrusions 16 containing Ba, Ti, and Si in a predetermined molar ratio has a comparatively low linear expansion coefficient. Since the interface protrusions 16 are provided on the surface of the external electrode 6 on the boundary layer 14 side, the components constituting the external electrodes 6 tighten the interface protrusions 16 with thermal stress during cooling in the baking. This is considered to make it possible to more firmly bond the dielectric layers 10 and the external electrodes 6 and to further increase the bonding strength.

In the present embodiment, irregularities of the boundary layer 14 and/or the interface protrusions 16 are easily formed near the joint boundary 46 of the first region 6a1. Thus, the first glass 621 contained in the first region 6a1 can enter the irregularities formed by the boundary layer 14 and/or the interface protrusions 16 and spread wet, and a more dense structure can be obtained near the joint boundary 46 of the element body 4. As a result, the prevention effect on the intrusion of plating into the element body 4 can further be enhanced.

Hereinbefore, embodiments of the present invention are explained, but the present invention is not limited to the above-mentioned embodiments and can be modified variously without departing from the gist of the present invention.

In the present embodiment, for example, the multilayer ceramic capacitor 2 is exemplified as the ceramic electronic device, but the ceramic electronic device of the present invention may be, for example, bandpass filters, multilayer three-terminal filters, thermistor, varistors, or the like.

In the present embodiment, the dielectric layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The element body 4 is not necessarily a laminated body and may be a single layer. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present invention is explained in more detail with examples of the present invention, but the present invention is not limited to the examples.

Experiment 1

In Experiment 1, multilayer ceramic capacitors 2 according to Sample Nos. 1-6 were manufactured in the following manner. First, a dielectric-layer paste and an internal-electrode-layer paste were prepared, and green chips were manufactured by a sheet method using the pastes. At this time, as dielectric raw materials to be a main component of dielectric layers 10, $BaTiO_3$ was used in Sample Nos. 1-4, and $(Ca_{0.7}Sr_{0.3})(Ti_{0.04}Zr_{0.96})O_3$ was used in Sample Nos. 5 and 6. In each sample, MnO, $Al_2O_3$, $SiO_2$, and the like were added as sub-components of the dielectric layers 10, and the main component of internal electrode layers 12 was Ni.

Next, the green chips obtained above were subjected to a binder removal treatment with the conditions mentioned in the embodiments and thereafter subjected to a firing treatment to obtain an element body 4. The conditions for the firing treatment were holding temperature: 1300° C., holding time: 2 hours, atmospheric gas: humidified $N_2+H_2$ mixed gas. Then, the above-mentioned element body 4 was subjected to an annealing treatment with the conditions mentioned in the embodiments.

Next, a first conductive paste and a second conductive paste for a baked electrode layer were prepared. 100 parts by mass of Cu powder constituting a conductor 61 and 7 parts by mass of $B_2O_3$—$SiO_2$—ZnO based glass to be the compositions shown in Table 1 as a non-metal component 62 were added to the first conductive paste. Meanwhile, 100 parts by mass of Cu powder constituting a conductor 61 and 7 parts by mass of $B_2O_3$—$SiO_2$—ZnO based glass to be the compositions shown in Table 1 as a non-metal component 62 were added to the second conductive paste.

Next, the above-mentioned first conductive paste was applied to the outer surface (a part of an end surface 4a and a side surface 4b) of the element body 4 by a dipping method and dried, and the second conductive paste was applied by a dipping method and dried. Then, the element body 4 was held at 800° C. for 0.2 hours to bake the second conductive paste, and a baked electrode layer 6a including a first region 6a1 and a second region 6a2 was formed.

A Ni plating electrode layer 6b1 and a Sn plating electrode layer 6b2 were formed on the baked electrode layer 6a. Accordingly, capacitor samples (multilayer ceramic capacitors 2) with the external electrodes 6 were obtained.

In Experiment 1, the size of the element body 4 in any of the capacitor samples was L0×W0×T0=2.0 mm×1.25 mm×1.25 mm. The lamination number of dielectric layers 10 sandwiched by the internal electrode layers 12 was 80.

Samples for destructive inspection was extracted from the capacitor samples according to Experiment 1, and a cross-sectional observation was performed by SEM using the samples. Specifically, the extracted samples were cut along the X-Z plane, the cross sections were subjected to mirror polishing, and an average thickness Td of the dielectric layers 10, an average thickness Te of the internal electrode layers 12, an average thickness Ts of the baked electrode layers 6a, and an average thickness Tt of the external electrodes 6 on the end surface side were thereafter measured by SEM. The measurement results of Experiment 1 were as follows.

Average Thickness Td of Dielectric Layers 10: 10 μm

Average Thickness Te of Internal Electrode Layers 12: 1.5 μm

Average Thickness Ts of Baked Electrode Layers 6a: 8.2 μm

Average Thickness Tt of External Electrodes 6: 89 μm

In the above-mentioned cross-sectional observation, the conductor 61 and the non-metal component 62 (glass) contained in the baked electrode layer 6a were subjected to a component analysis by EPMA, and the first region 6a1 and the second region were determined by the method described in First Embodiment.

In Sample No. 3, Sample No. 4, and Sample No. 6, the same glass was put into the first conductive paste and the second conductive paste, and the first region 6a1 and the second region 6a2 were not thereby distinguished from each other.

In Sample No. 2, since the first glass was not put into the first conductive paste and the second glass was not put into the second conductive paste, the first region 6a1 and the second region 6a2 were determined in the following manner.

That is, the first region 6a1 and the second region 6a2 were determined in such a manner that an average thickness (t1) of the first region 6a1 was (½) times as large as the average thickness Ts of the baked electrode layer 6a, and that an average thickness (t2) of the second region 6a2 was (½) times as large as the average thickness Ts of the baked electrode layer 6a.

As a result of the component analysis, the composition of the raw material powder added to the first conductive paste and the composition of the first region 6a1 were substantially the same, and the composition of the raw material powder added to the second conductive paste and the composition of the second region 6a2 were substantially the same.

In Experiment 1, a solderability test was conducted so as to evaluate the plating property (presence or absence of plating defects) of the prepared capacitor samples. In addition, a post-240-hour resistance test and a crack number test were performed so as to evaluate the prevention effect on the intrusion of plating into the element body 4. The results are shown in Table 2. The details of each test are described below.

Solderability Test

The capacitor samples were immersed in a solder bath at 245° C. for 3 seconds. At this time, Sn—Ag—Cu solder was used, and 0.1 mm of the capacitor samples on the end surface side was immersed in the solder bath. Then, the capacitor samples were pulled up from the solder bath, and the end surfaces 4a of the capacitor samples were thereafter observed. A case in which the area where the solder was spread wet over the end surface 4a was 95% or more was considered to be pass, and a case in which the area where the solder was spread wet over the end surface 4a was less than 95% was considered to be fail. The test was performed on 10 capacitor samples for each example. A ratio of failed samples (NG ratio) was calculated.

Post-240-Hour Resistance Test

The obtained 80 capacitor samples were held at 125° C. in an application state of a DC voltage of 50V for 240 hours, and the number of capacitor samples in which the insulation resistance dropped by an order of magnitude or more from the start of application was counted.

Crack Number Test

The capacitor samples were mounted on a FR4 substrate (glass epoxy substrate) with Sn—Ag—Cu solder, put into a pressure cooker tank, and an accelerated moisture resistance test was carried out in an atmosphere of 121° C. and 95% humidity for 100 hours. 100 tests were carried out for each capacitor sample. The number of defects in each capacitor sample is shown as the result of "crack number test".

TABLE 1

| | | First Region Each Component Content in Glass with respect to 1 part by mol of Total Content of B, Si, and Zn in terms of Oxide in Glass [parts by mol] | | | Second Region Each Component Content in Glass with respect to 1 part by mol of Total Content of B, Si, and Zn in terms of Oxide in Glass [parts by mol] | | |
|---|---|---|---|---|---|---|---|
| Sample No. | Dielectric Layers Composition of Main Component | $B_2O_3$ (FB) | $SiO_2$ (FSi) | ZnO (FZn) | $B_2O_3$ (FB) | $SiO_2$ (FSi) | ZnO (FZn) |
| 1 | $BaTiO_3$ | 0.55 | 0.24 | 0.21 | 0.32 | 0.49 | 0.19 |
| 2 | $BaTiO_3$ | 0.31 | 0.48 | 0.21 | 0.54 | 0.22 | 0.24 |
| 3 | $BaTiO_3$ | 0.33 | 0.49 | 0.18 | 0.33 | 0.49 | 0.18 |
| 4 | $BaTiO_3$ | 0.54 | 0.23 | 0.23 | 0.54 | 0.23 | 0.23 |
| 5 | $(Ca_{0.7}Sr_{0.3})(Ti_{0.04}Zr_{0.96})O_3$ | 0.51 | 0.22 | 0.27 | 0.3 | 0.46 | 0.24 |
| 6 | $(Ca_{0.7}Sr_{0.3})(Ti_{0.04}Zr_{0.96})O_3$ | 0.32 | 0.47 | 0.21 | 0.32 | 0.47 | 0.21 |

TABLE 2

| Sample No. | SB/FB | SSi/FSi | Solderability Test | Post-240-hour Resistance Test | Crack Number Test |
|---|---|---|---|---|---|
| 1 | 0.58 | 2.04 | 0/10 | 0/80 | 0/1000 |
| 2 | 1.74 | 0.46 | 3/10 | 0/80 | 0/1000 |
| 3 | 1.00 | 1.00 | 0/10 | 2/80 | 0/1000 |
| 4 | 1.00 | 1.00 | 4/10 | 0/80 | 0/1000 |
| 5 | 0.59 | 2.09 | 0/10 | 0/80 | 0/1000 |
| 6 | 1.00 | 1.00 | 0/10 | 0/80 | 2/1000 |

According to Table 1 and Table 2, when (SB/FB)<1 and (SSi/FSi)>1 were satisfied (Sample No. 1), and the results of the solderability test were more favorable than those when (SB/FB) was 1.74 and (SSi/FSi) was 0.46 (Sample No. 2) and when (SB/FB) was 1.00, (SSi/FSi) was 1.00, and the B content was high and the Si content was low in the second region 6a2 (Sample No. 4).

When (SB/FB)<1 and (SSi/FSi)>1 were satisfied (Sample No. 1), the second region 6a2 containing the second glass 622 with a predetermined composition was present on the outer surface 6ab of the baked electrode layer 6a to be in contact with the plating electrode. The second glass 622 has a high softening point. When the predetermined second glass 622 was present on the outer surface 6ab side, it is considered that the deposition of the second glass 622 on the outer surface 6ab of the baked electrode layer 6a was prevented. As a result, it is considered that the generation of plating defects was prevented in the formation of the plating electrode on the baked electrode layer 6a.

According to Table 1 and Table 2, when (SB/FB)<1 and (SSi/FSi)>1 were satisfied (Sample No. 1), the results of the post-240-hour resistance test were more favorable than those when (SB/FB) was 1.00, (SSi/FSi) was 1.00, and the B content was low and the Si content was high in the first region 6a1 (Sample No. 3).

When (SB/FB)<1 and (SSi/FSi)>1 were satisfied (Sample No. 1), the first glass 621 having a predetermined composition was contained in the first region 6a1 to be bonded with the end surface of the element body 4. The first glass 621 has a low softening point. Thus, the inclusion of the first glass 621 improves the sinterability of the baked electrode layer 6a. In addition, the first glass 621 is spread wet and filled in the conductor 61 and between the conductor 61 and the end surface of the element body 4. As a result, the structure of the external electrode 6 in the vicinity of the element body 4 becomes dense. Thus, the intrusion of plating into the element body 4 can be prevented.

The intrusion of hydrogen ions into the element body 4 may decrease the electrical resistance of the capacitor. In Sample No. 1, however, since the intrusion of hydrogen ions into the element body 4 was prevented, it is considered that the decrease in the electric resistance of the capacitor was prevented.

According to Table 1 and Table 2, when (SB/FB)<1 and (SSi/FSi)>1 were satisfied (Sample No. 6), the crack number was more favorable than those when (SB/FB) was 1.00, (SSi/FSi) was 1.00, and the B content was low and the Si content was high in the first region 6a1 (Sample No. 6). When (SB/FB)<1 and (SSi/FSi)>1 were satisfied (Sample No. 5), it is considered that the intrusion of plating into the element body 4 was prevented due to the same reason as Sample No. 1.

When the plating containing hydrogen intrudes the element body 4, the Ni internal electrode layers 12 are easily corroded. In this case, the interface between the dielectric layers 10 and the Ni internal electrode layers 12 is particularly easily corroded. When the main component of the dielectric layers 10 is (Ca, Sr)ZrO$_3$, the dielectric layers 10 are harder than when the main component of the dielectric layers 10 is BaTiO$_3$, and the difference in linear expansion coefficient from the Ni internal electrode layers 12 is large. Thus, when the main component of the dielectric layers 10 is (Ca, Sr)ZrO$_3$, the intrusion of hydrogen ions into the element body 4 easily generates cracks because the stress on the interface between the Ni internal electrode layers 12 and the dielectric layers 10 due to the corrosion of the Ni internal electrode layers 12 becomes larger.

On the other hand, in Sample No. 5, since the intrusion of plating into the element body 4 was prevented, the generation of cracks was prevented even though the main component of the dielectric layers 10 was (Ca, Sr)ZrO$_3$.

According to Table 1 and Table 2, in Sample No. 5, the first glass 621 was contained in the first region 6a1, and the second glass 622 was contained in the second region 6a2.

Experiment 2

In Experiment 2, capacitor samples were obtained similarly to Experiment 1 except that the average thickness (t2) of the first region 6a2 for the average thickness (Ts) of the baked electrode layer 6a was changed by changing the application thickness of the second conductive paste in terms of Sample Nos. 21-24. In Sample No. 1 and Sample Nos. 21-24, a solderability test, a post-PCT solderability test, a post-240-hour resistance test, and a post-500-hour resistance test were performed. The results are shown in Table 3. The post-PCT solderability test and the post-500-hour resistance test were performed as follows.

t2/Ts of Sample No. 1 and Sample Nos. 21-24 was measured by the method described in First Embodiment.

Post-PCT Solderability Test

As a pretreatment for the test, the capacitor samples were held in a thermostatic bath (PCT tank) controlled at a temperature of 105° C. and a relative humidity of 100% RH for 4 hours. Then, the capacitor samples were immersed in a solder bath at 245° C. for 3 seconds. At this time, Sn—Ag—Cu solder was used, and 0.1 mm of the capacitor samples on the end surface side was immersed in the solder bath. Then, the capacitor samples were pulled up from the solder bath, and the end surfaces 4a of the capacitor samples were thereafter observed. A case in which the area where the solder was spread wet over the end surface 4a was 95% or more was considered to be pass, and a case in which the area where the solder was spread wet over the end surface 4a was less than 95% was considered to be fail. The test was performed on 10 capacitor samples for each example. A ratio of failed samples (NG ratio) was calculated.

Post-500-Hour Resistance Test

The obtained 80 capacitor samples were held at 125° C. in an application state of a DC voltage of 50V for 500 hours, and the number of capacitor samples in which the insulation resistance dropped by an order of magnitude or more from the start of application was counted.

TABLE 3

| Sample No. | Composition of Main Component of Dielectric Layers | Ratio (t2/Ts) of Average Thickness (t2) of Second Region to Average Thickness (Ts) of Baked Electrode Layer | Solderability Test | Post-PCT Solderability Test | Post-240-hour Resistance Test | Post-500-hour Resistance Test |
|---|---|---|---|---|---|---|
| 21 | $BaTiO_3$ | 0.12 | 0/10 | 2/10 | 0/80 | 0/80 |
| 22 | $BaTiO_3$ | 0.22 | 0/10 | 0/10 | 0/80 | 0/80 |
| 1  | $BaTiO_3$ | 0.4  | 0/10 | 0/10 | 0/80 | 0/80 |
| 23 | $BaTiO_3$ | 0.78 | 0/10 | 0/10 | 0/80 | 0/80 |
| 24 | $BaTiO_3$ | 0.87 | 0/10 | 0/10 | 0/80 | 3/80 |

According to Table 3, when t2/Ts was 0.22-0.78 (Sample Nos. 22, 1, and 23), the results of the post-PCT solderability test were more favorable than those when t2/Ts was 0.12.

This is probably because, in Sample Nos. 22, 1, and 23, the first region 6a2 had a sufficient thickness, and the plating property thereby became more favorable.

When t2/Ts was 0.22-0.78 (Sample Nos. 22, 1, and 23), the results of the post-500-hour resistance test were more favorable than those when t2/Ts was 0.87.

This is probably because, in Sample Nos. 22, 1, and 23, since the first region 6a1 had a sufficient thickness as the second region 6a2 was not too thick, the prevention effect on the intrusion of plating into the element body 4 was further enhanced, and the decrease in the electrical resistance of the capacitor was sufficiently prevented.

Experiment 3

In Experiment 3, capacitor samples were obtained similarly to Experiment 1 except that an average of a ratio (N/M) of a total area (N) of the non-metal components 62 and the voids 63 to a unit cross-sectional area (M) of the baked electrode layer 6a was changed by changing the amount of the first glass 621 contained in the first conductive paste and the amount of the second glass 622 contained in the second conductive paste in terms of Sample Nos. 31 and 32. Table 4 shows the results of a solderability test, a post-240-hour resistance test, and a post-500-hour resistance test.

N/M of Sample Nos. 1, 31, and 32 was measured by the method described in First Embodiment.

TABLE 4

| Sample No. | Composition of Main Component of Dielectric Layers | Average of Ratio (N/M) of Total Area (N) of Non-Metal Components and Voids to Unit Cross-Sectional Area (M) of Baked Electrode Layer | Solderability Test | Post-240-hour Resistance Test | Post-500-hour Resistance Test |
|---|---|---|---|---|---|
| 31 | $BaTD_3$ | 0.41 | 0/10 | 0/80 | 1/80 |
| 32 | $BaTD_3$ | 0.11 | 0/10 | 0/80 | 0/80 |
| 1  | $BaTD_3$ | 0.22 | 0/10 | 0/80 | 0/80 |

When an average of N/M was 0.22 or less (Sample Nos. 32 and 1), the results of the post-500-hour resistance test were more favorable than those when the average of N/M was 0.41 (Sample No. 31).

In Sample Nos. 32 and 1, it is considered that the prevention effect on the intrusion of plating into the element body 4 was further enhanced, and the decrease in the electrical resistance of the capacitor was sufficiently prevented.

Experiment 4

In Experiment 4, capacitor samples were obtained similarly to Experiment 1 except for changing the first glass 621 contained in the first conductive paste so as to have the composition shown in Table 5 and changing the second glass 622 contained in the second conductive paste so as to have the composition shown in Table 5. Table 6 shows the results of a solderability test and a post-240-hour resistance test.

TABLE 5

| | | First Electrode Layer Each Component Content in First Glass with respect to 1 part by mol of Total Content of B, Si, and Zn in terms of Oxide in First Glass [parts by mol] | | | Second Electrode Layer Each Component Content in Second Glass with respect to 1 part by mol of Total Content of B, Si, and Zn in terms of Oxide in Second Glass [parts by mol] | | |
|---|---|---|---|---|---|---|---|
| Sample No. | Dielectric Layers Composition of Main Component | $B_2O_3$ (FB) | $SiO_2$ (FSi) | ZnO (FZn) | $B_2O_3$ (SB) | $SiO_2$ (SSi) | ZnO (SZn) |
| 1 | $BaTiO_3$ | 0.55 | 0.24 | 0.21 | 0.32 | 0.49 | 0.19 |
| 41 | $BaTiO_3$ | 0.54 | 0.34 | 0.12 | 0.26 | 0.41 | 0.33 |
| 42 | $BaTiO_3$ | 0.41 | 0.27 | 0.32 | 0.32 | 0.49 | 0.19 |
| 43 | $BaTiO_3$ | 0.59 | 0.16 | 0.25 | 0.38 | 0.51 | 0.11 |
| 44 | $BaTiO_3$ | 0.53 | 0.26 | 0.21 | 0.30 | 0.57 | 0.13 |

Tabb 6

| Sample No. | SB/FB | SSi/FSi | SZn/FZn | Solderability Test | Post-240-hour Resistance Test |
|---|---|---|---|---|---|
| 1 | 0.58 | 2.04 | 0.89 | 0/10 | 0/80 |
| 41 | 0.48 | 1.21 | 2.75 | 0/10 | 0/80 |
| 42 | 0.77 | 1.83 | 0.59 | 0/10 | 0/80 |
| 43 | 0.64 | 3.19 | 0.44 | 0/10 | 0/80 |
| 44 | 0.57 | 2.19 | 0.62 | 0/10 | 0/80 |

According to Table 6, the results of the solderability test and the post-240-hour resistance test were favorable in Sample Nos. 1 and 41-44, where: (SB/FB)<1 and (SSi/FSi) >1 were satisfied; the B content in terms of oxide in the second glass 622 was 0.25-0.4 parts by mol, the Si content in terms of oxide in the second glass 622 was 0.4-0.6 parts by mol, and the Zn content in terms of oxide in the second glass 622 was 0.1-0.35 parts by mol, provided that the total content of B, Si, and Zn in terms of oxide in the second glass 622 was 1 part by mol; and the B content in terms of oxide in the first glass 621 was 0.4-0.6 parts by mol, the Si content in terms of oxide in the first glass 621 was 0.15-0.35 parts by mol, and the Zn content in terms of oxide in the first glass 621 was 0.1-0.35 parts by mol, provided that the total content of B, Si, and Zn in terms of oxide in the first glass 621 was 1 part by mol.

DESCRIPTION OF THE REFERENCE NUMERICAL

2 . . . multilayer ceramic capacitor
4 . . . element body
4a . . . end surface
4b . . . side surface
10 . . . ceramic layer (dielectric layer)
12 . . . internal electrode layer
14 . . . boundary layer
16 . . . interface protrusion
6 . . . external electrode
6a . . . baked electrode layer
6a1 . . . first region
6a2 . . . second region
61 . . . conductor
62 . . . non-metal component
63 . . . void
621 . . . first glass
622 . . . second glass
6ab . . . outer surface (boundary between baked electrode layer and plating electrode layer)
6b . . . plating electrode layer
6b1 . . . Ni plating layer
6b2 . . . Sn plating layer
46 . . . joint boundary

What is claimed is:

1. A ceramic electronic device comprising:
an element body formed by laminating a ceramic layer and an internal electrode layer; and
an external electrode electrically connected to at least one end of the internal electrode layer,
wherein
the external electrode includes a baked electrode layer, the baked electrode layer includes:
- a first region contacted with an end surface of the element body and located near a joint boundary with the element body; and
- a second region located outside the first region and constituting an outer surface of the baked electrode layer, the first region includes a first glass,
the second region includes a second glass,
a molar content rate of B in terms of oxide to a total molar content of B, Si, and Zn in terms of oxide in the first glass is higher than a molar content rate of B in terms of oxide to a total molar content of B, Si, and Zn in terms of oxide in the second glass,
a molar content rate of Si in terms of oxide to a total molar content of B, Si, and Zn in terms of oxide in the first glass is lower than a molar content rate of Si in terms of oxide to a total molar content of B, Si, and Zn in terms of oxide in the second glass, and
an oxide of B is $B_2O_3$, an oxide of Si is $SiO_2$, and an oxide of Zn is ZnO, in terms of oxide.

2. The ceramic electronic device according to claim 1, wherein the ceramic layer comprises a perovskite compound represented by $ABO_3$ as a main component.

3. The ceramic electronic device according to claim 1, wherein the perovskite compound represented by $ABO_3$ is represented by $(Ba_{1-a-b}Sr_aCa_b)_m(Ti_{1-c-d}Zr_cHf_d)O_3$ and satisfies $0.94<m<1.1$, $0 \leq a \leq 1$, $0 \leq b \leq 1$, $0 \leq c \leq 1$, and $0 \leq d \leq 1$.

4. The ceramic electronic device according to claim 1, wherein a conductor of the baked electrode layer includes at least one of Cu and Cu alloys as a main component.

5. The ceramic electronic device according to claim 1, wherein
a B content in terms of oxide in the second glass is 0.25-0.4 parts by mol,
a Si content in terms of oxide in the second glass is 0.4-0.6 parts by mol, and
a Zn content in terms of oxide in the second glass is 0.1-0.35 parts by mol,
provided that a total content of B, Si, and Zn in terms of oxide in the second glass is 1 part by mol.

6. The ceramic electronic device according to claim 1, wherein
a B content in terms of oxide in the first glass is 0.4-0.6 parts by mol,
a Si content in terms of oxide in the first glass is 0.15-0.35 parts by mol, and
a Zn content in terms of oxide in the first glass is 0.1-0.35 parts by mol,
provided that a total content of B, Si, and Zn in terms of oxide in the first glass is 1 part by mol.

7. The ceramic electronic device according to claim 1, wherein a ratio of an average thickness of the second region to an average thickness of the baked electrode layer is 0.22 to 0.78.

8. The ceramic electronic device according to claim 1, wherein
an average of a ratio of a total area of non-metal components and voids to a unit cross-sectional area of the baked electrode layer is 0.10 to 0.45, and
the non-metal components include the first glass and the second glass.

* * * * *